United States Patent
Flachs et al.

(10) Patent No.: US 8,862,827 B2
(45) Date of Patent: Oct. 14, 2014

(54) EFFICIENT MULTI-LEVEL SOFTWARE CACHE USING SIMD VECTOR PERMUTE FUNCTIONALITY

(75) Inventors: Brian Flachs, Austin, TX (US); Barry L. Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/648,667

(22) Filed: Dec. 29, 2009

(65) Prior Publication Data

US 2011/0161548 A1 Jun. 30, 2011

(51) Int. Cl.
*G06F 12/08* (2006.01)
*G06F 9/45* (2006.01)

(52) U.S. Cl.
CPC .......... *G06F 12/0864* (2013.01); *G06F 8/4442* (2013.01); *G06F 12/0862* (2013.01); *G06F 12/0875* (2013.01); *G06F 2212/6082* (2013.01)
USPC ................... 711/128; 711/136; 711/E12.018; 712/22

(58) Field of Classification Search
None
See application file for complete search history.

(56) References Cited

U.S. PATENT DOCUMENTS

| | | | |
|---|---|---|---|
| 5,099,415 A * | 3/1992 | Osler et al. ..................... | 711/207 |
| 5,940,877 A * | 8/1999 | Eickemeyer et al. ......... | 711/220 |
| 6,138,206 A * | 10/2000 | Fisher et al. .................. | 711/118 |
| 6,223,320 B1 | 4/2001 | Dubey et al. .................. | 714/757 |
| 7,386,842 B2 | 6/2008 | Eichenberger et al. ....... | 717/150 |
| 7,395,531 B2 | 7/2008 | Eichenberger et al. ....... | 717/160 |
| 7,421,566 B2 | 9/2008 | Gschwind et al. ............. | 712/216 |
| 7,536,510 B1 * | 5/2009 | Thompson ..................... | 711/128 |
| 2004/0051713 A1 | 3/2004 | Fossum et al. ................ | 345/440 |
| 2007/0186077 A1 | 8/2007 | Gschwind et al. ................ | 712/3 |
| 2010/0100685 A1 * | 4/2010 | Kurosawa et al. ............. | 711/128 |

FOREIGN PATENT DOCUMENTS

| | | | |
|---|---|---|---|
| GB | 2 394 571 | 4/2004 | ............. G06F 15/80 |
| WO | WO 00/26790 | 5/2000 | ............. G06F 12/02 |

OTHER PUBLICATIONS

Herbordt et al., "Memory Considerations for High Performance SIMD Systems with On-Chip Control," 2003 IEEE International Workshop on Computer Architecture for Machine Perception, pp. 121-132.

* cited by examiner

*Primary Examiner* — Charles Rones
*Assistant Examiner* — Ryan Dare
(74) *Attorney, Agent, or Firm* — VanLeeuwen & VanLeeuwen; John D. Flynn

(57) ABSTRACT

A cache manager receives a request for data, which includes a requested effective address. The cache manager determines whether the requested effective address matches a most recently used effective address stored in a mapped tag vector. When the most recently used effective address matches the requested effective address, the cache manager identifies a corresponding cache location and retrieves the data from the identified cache location. However, when the most recently used effective address fails to match the requested effective address, the cache manager determines whether the requested effective address matches a subsequent effective address stored in the mapped tag vector. When the cache manager determines a match to a subsequent effective address, the cache manager identifies a different cache location corresponding to the subsequent effective address and retrieves the data from the different cache location.

25 Claims, 9 Drawing Sheets

Slot 1 Rotate Pattern 700 →

*FIG. 7A*

Slot 2 Rotate Pattern 710 →

*FIG. 7B*

Slot 3 Rotate Pattern 720 →

*FIG. 7C*

Hard Miss Rotate Pattern 730 →

EFFICIENT MULTI-LEVEL SOFTWARE CACHE USING SIMD VECTOR PERMUTE FUNCTIONALITY

BACKGROUND

A computer system typically includes a memory hierarchary for data storage and retrieval. The memory hierarchary includes one or more caches and system memory. The computer system tracks data stored in the caches using a mapping function, such as a direct mapping, a set-associative mapping, or a fully-associative mapping.

In a direct-mapped cache, each address in main memory has one place in the cache for which it may be stored. In a set-associative mapped cache, each address in main memory has a particular number of places in the cache for which it may be stored. This is also referred to as an "n-way" associative mapped cache, where "n" is the number of places that a particular address in main memory may be stored in cache. In a fully-associative mapped cache, any address in main memory may map to any address in the cache. The direct mapped cache is typically the fastest but least flexible approach, and the fully-associative mapped cache is the most flexible but slowest approach.

SUMMARY

A cache manager receives a request for data, which includes a requested effective address. The cache manager determines whether the requested effective address matches a most recently used effective address stored in a mapped tag vector. When the requested effective address matches the most recently used effective address, the cache manager identifies a corresponding cache location and retrieves the data from the identified cache location. However, when the requested effective address fails to match the most recently used effective address, the cache manager determines whether the requested effective address matches a subsequent effective address stored in the same mapped tag vector. When the cache manager determines a match to a subsequent effective address, the cache manager identifies a different cache location corresponding to the subsequent effective address and retrieves the data from the different cache location.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

A system, method, and program product are presented that provides an efficient multi-level software cache directory using Single Instruction Multiple Data (SIMD) permute functionality. The system, method, and program product allows most recently used (MRU) elements of a software managed cache to be efficiently accessed using a low-overhead lookup function (e.g., direct mapped), while maintaining benefits of miss rate and cast out policy of more complex caches (e.g., set-associative mapping).

Figure 1:
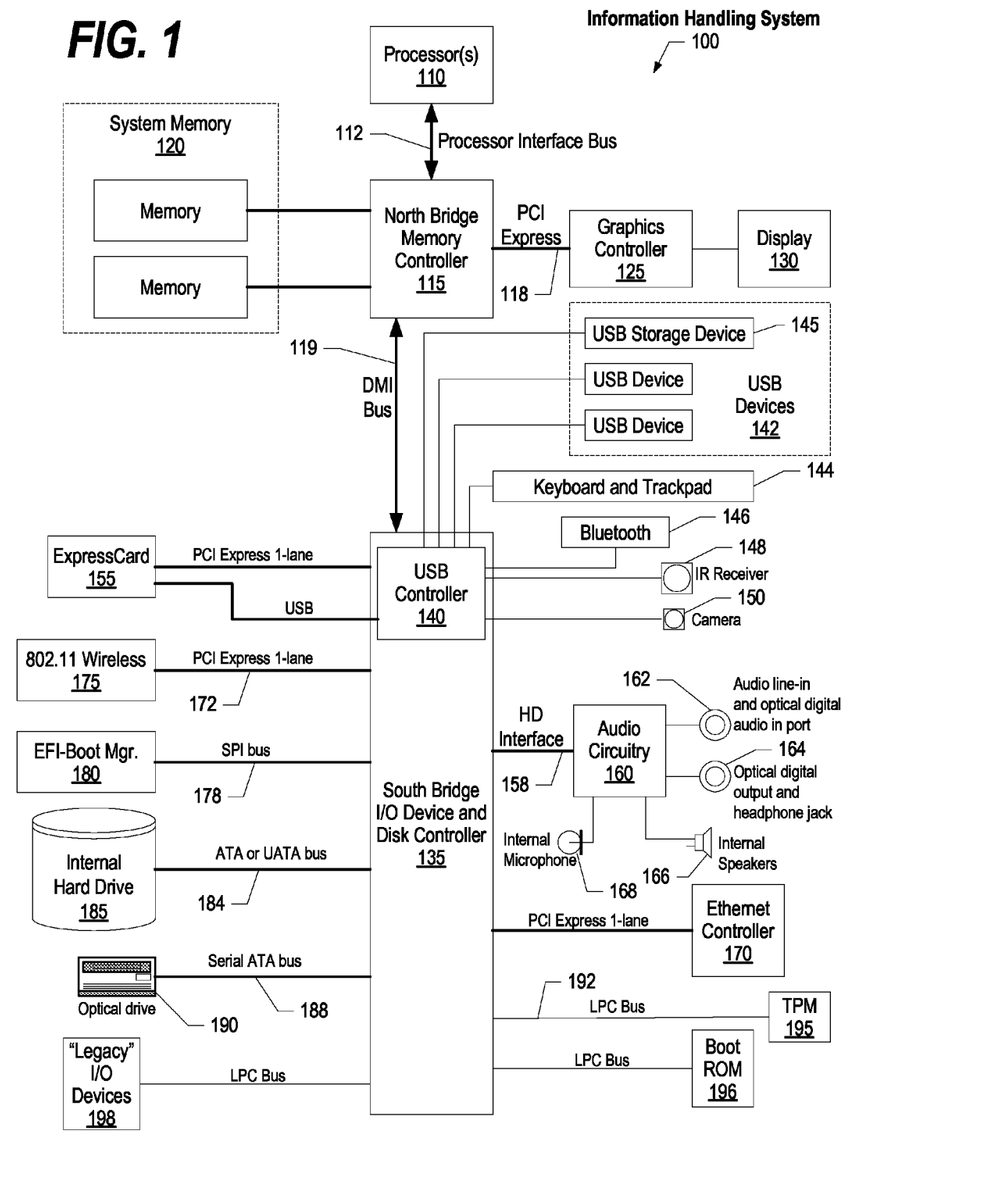
FIG. 1 is a block diagram of an information handling system in which the methods described herein can be implemented.
Figure 2:
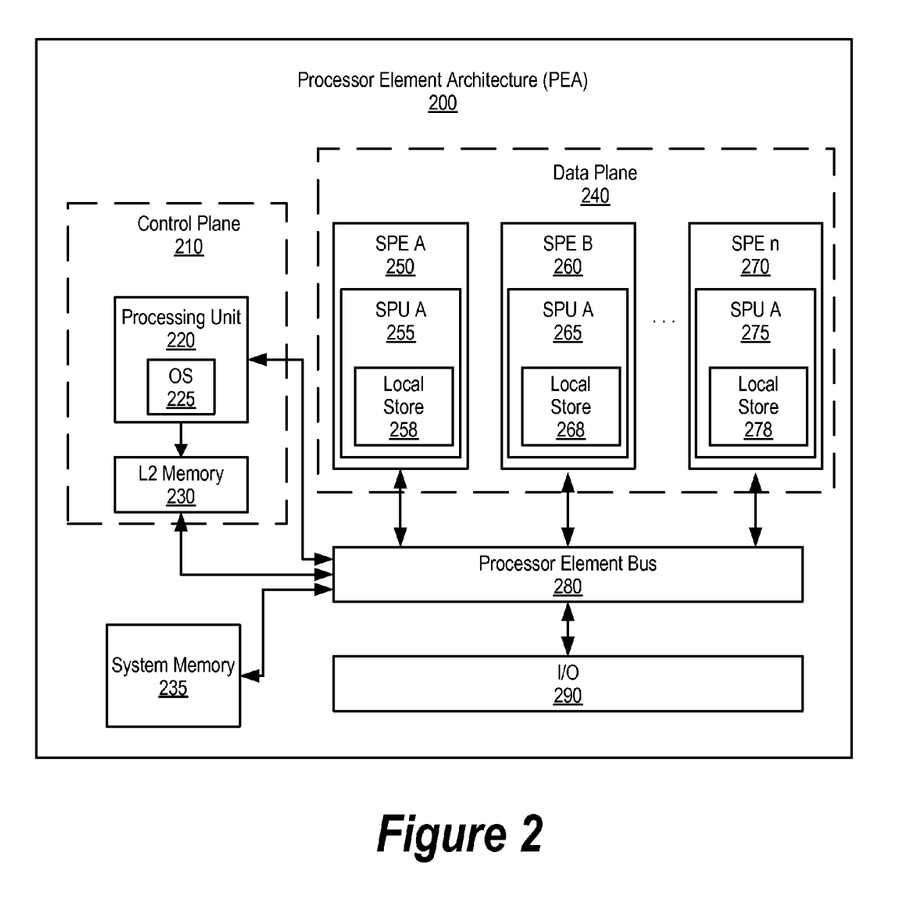
FIG. 2 is another embodiment of an information handling system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, multi-chip module, or other form factor computer or data processing system. In addition, an information handling system may take other form factors such as a personal digital assistant (PDA), a gaming device, ATM machine, a portable telephone device, a communication device or other devices that include a processor and memory.

FIG. 2 is another embodiment of an information handling system capable of performing the computing operations described herein. Processor element architecture (200) includes multiple heterogeneous processors that share a common memory and a common bus. Processor element architecture (PEA) 200 sends and receives information to/from external devices through input output 290, and distributes the information to control plane 210 and data plane 240 using processor element bus 280. Control plane 210 manages PEA 200 and distributes work to data plane 240.

Control plane 210 includes processing unit 220, which runs operating system (OS) 225. For example, processing unit 220 may be a Power PC core that is embedded in PEA 200 and OS 225 may be a Linux operating system. Processing unit 220 manages a common memory map table for PEA 200. The memory map table corresponds to memory locations included in PEA 200, such as L2 memory 230 as well as non-private memory included in data plane 240.

Data plane 240 includes Synergistic Processing Elements (SPE) 250, 260, and 270. Each SPE processes data information and each SPE may have different instruction sets. For example, PEA 200 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPUs 255, 265, 275), which is a processing core, such as a digital signal processor, a microcontroller, a microprocessor, or a combination of these cores. Each SPU includes a local storage area (local stores 258, 268, and 278), which may be segmented into private and non-private memory. Each of local stores 258, 268, and 278 store a cache directory and tag directory (instruction and/or data), along with a cache manager (see FIG. 3 and corresponding text for further details). And, each cache manager within each SPU manages their corresponding cache and retrieves data from system memory 235 accordingly.

Figure 3:
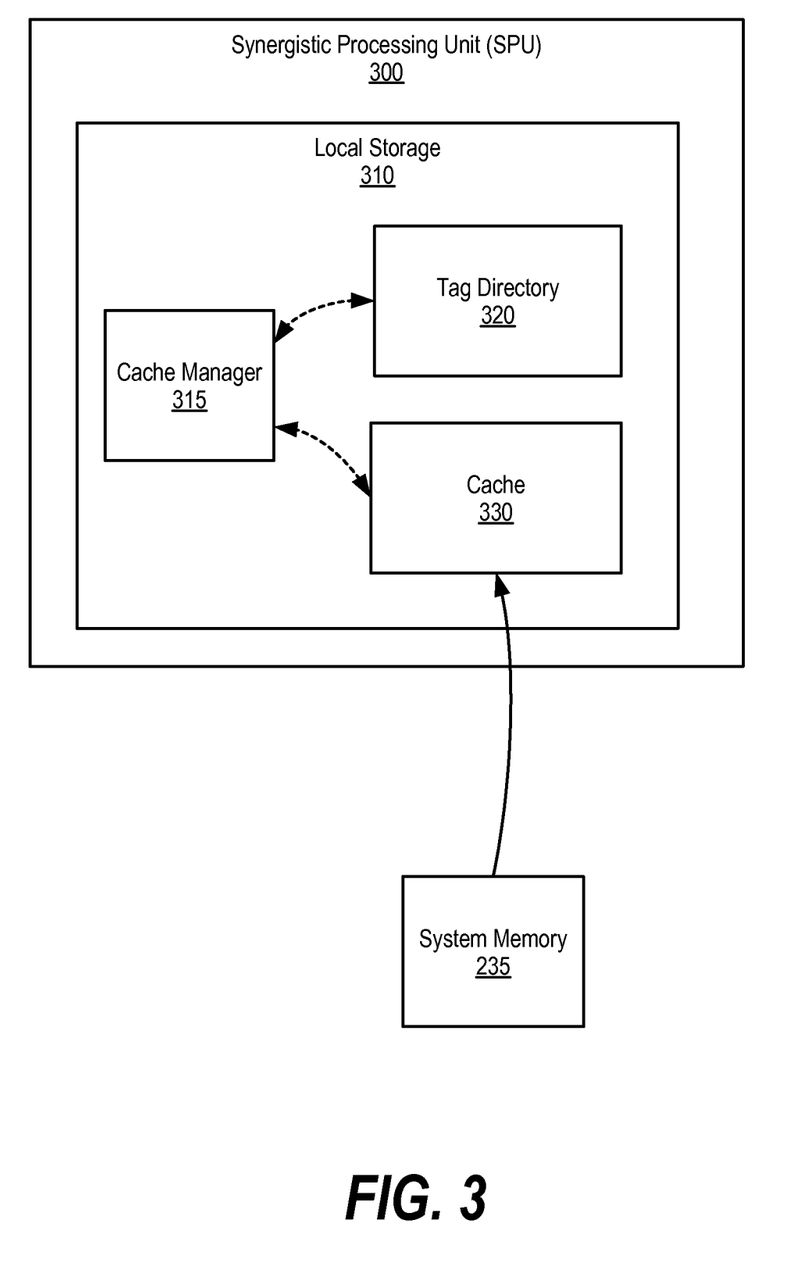
FIG. 3 is a diagram showing a local storage area that includes a cache manager, a cache, and a tag directory.

FIG. 3 is a diagram showing a local storage area that includes a cache manager, a cache, and a tag directory. SPU 300 includes local storage 310, which is a local storage area that SPU utilizes to load program instructions and data. Cache manager 315 manages tag directory 320 and cache 330. As discussed as an embodiment herein, tag directory 320 and cache 330 are used for data, although those skilled in the art can appreciate tag directory 320 and cache 330 may also be utilized for instructions.

Cache manager 315 stores data retrieved from system memory 235 into cache 330, and also stores effective addresses corresponding to the retrieved data in tag directory 320. Tag directory 320 uses tag vectors to store the effective addresses. In one embodiment, the tag vectors may be single instruction multiple data (SIMD) vectors that include multiple slot positions for storing the effective addresses. As discussed as an embodiment herein, each tag vector includes four slot positions but, as those skilled in the art can appreciate, the tag vectors may include more or less slot positions in different embodiments.

Figure 4A:
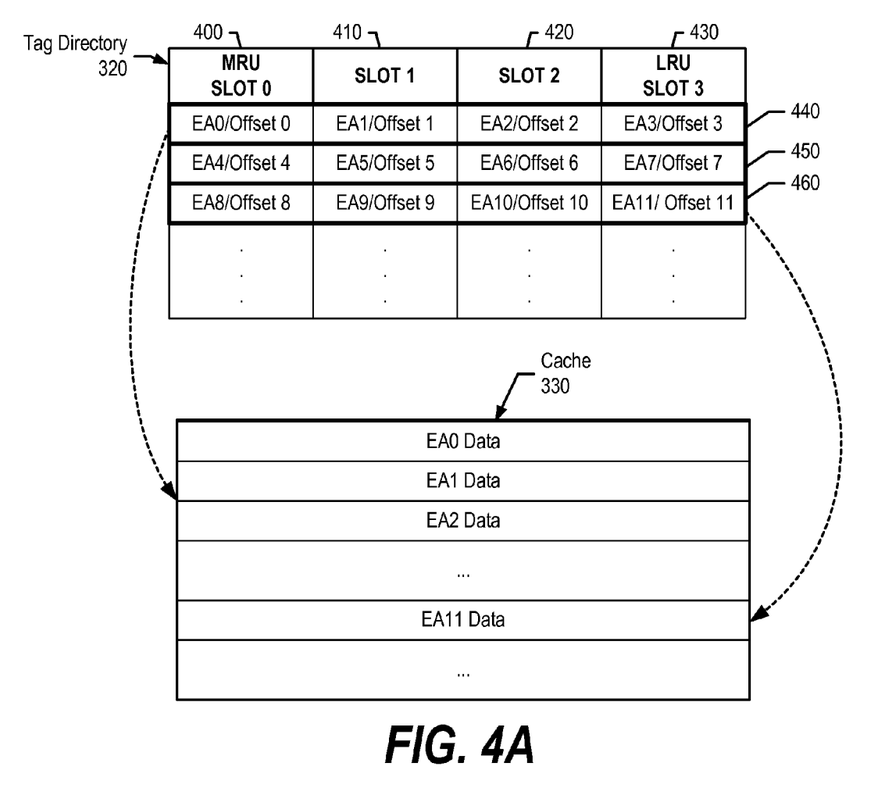
FIG. 4A is a diagram showing a correlation between effective addresses that are stored in a tag directory with data that is stored in a cache.

FIG. 4A is a diagram showing a correlation between effective addresses that are stored in a tag directory with data that is stored in a cache. Tag directory 320 includes three tag vectors 440-460. Each tag vector includes four slot positions 400-430. In one embodiment, for each of tag vectors 440-460, slot position 400 (slot 0) is considered a "most recently used slot position." This slot position stores most recently used effective addresses and, as shown in FIG. 4, also stores corresponding offsets that indicate a location within cache 330 from which to retrieve the data. Slot positions 410-430 are referred to as "subsequent slot positions," which store subsequent effective addresses, in order to distinguish these slot positions from most recently used slot position 400. In one embodiment, slot position 430 may be a "least recently used slot position" that stores a least recently used effective address. The cache manager performs a direct mapping discovery process using most recently used effective addresses stored in most recently used slot positions 400, and performs a set-associative mapping discovery process using subsequent effective addresses stored in subsequent slot positions 410-430 (see FIG. 5 and corresponding text for further details). When the cache manager identifies a cache "hit" during the set-associative mapping discovery process, the cache manager calls a rotate subroutine that rotates the matched subsequent effective address into the most recently used slot position (see FIGS. 7A-D and corresponding text for further details).

Figure 4B:
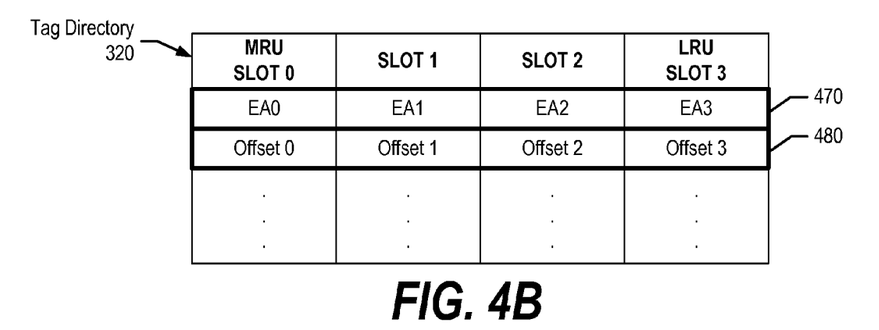
FIG. 4B is a diagram showing tag vectors and offset vectors stored in a tag directory.

FIG. 4B is a diagram showing tag vectors and offset vectors stored in a tag directory. FIG. 4B shows an embodiment when a cache manager stores effective addresses in tag vectors (tag vector 470) and stores their corresponding offsets (locations in cache where data is stored) in separate offset vectors (offset vector 480). In this embodiment, in addition to the rotate subroutines rotating effective addresses between tag vector slot positions as discussed above, the rotate subroutines also rotate corresponding offsets between offset vector slot positions accordingly.

Figure 5:
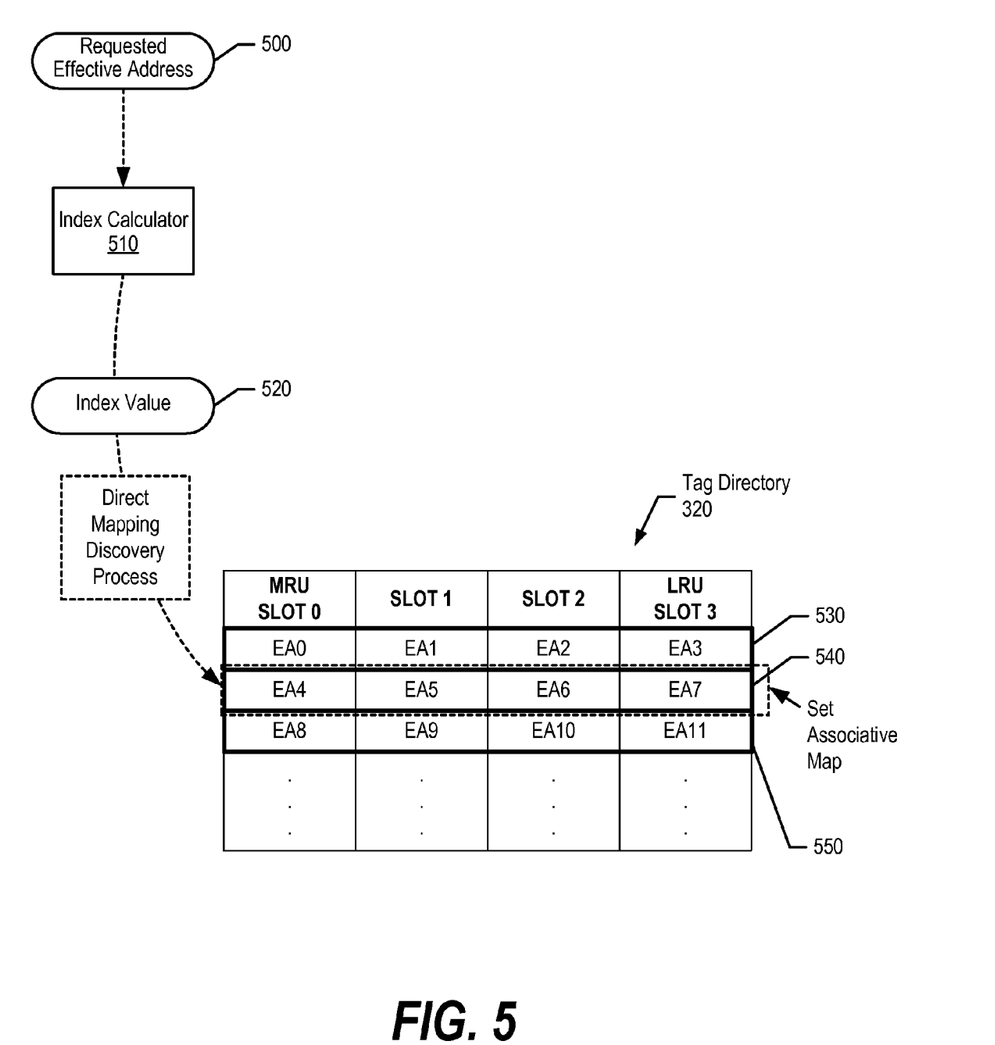
FIG. 5 is a diagram showing a multi-level mapping discovery process using tag vectors.

FIG. 5 is a diagram showing a multi-level mapping discovery process using tag vectors. A cache manager receives a request for data that includes requested effective address 500. In order to determine whether the data already resides in cache, the cache manager computes an index value (index value 520) via index calculator 510 for requested effective address 500. Index calculator 510 may be, for example, a hashing subroutine that hashes requested effective address 500.

The cache manager performs a direct mapping discovery process by mapping index value 520 to one of tag vectors 530-550. For example, assuming index value 520 is "2," the cache manager may select (map) the second tag vector (tag vector 540). Once the cache manager maps to the appropriate tag vector, the cache manager determines whether the mapped tag vector includes, in its most recently used slot position, an effective address that matches requested effective address 500. If so, the cache manager identifies a corresponding offset and retrieves the data from the cache. If the effective address in the most recently used slot position does not match, the cache manager performs a set-associative mapping discovery process on mapped tag vector 540's subsequent slot positions (see FIG. 9 and corresponding text for further details).

Figure 6:
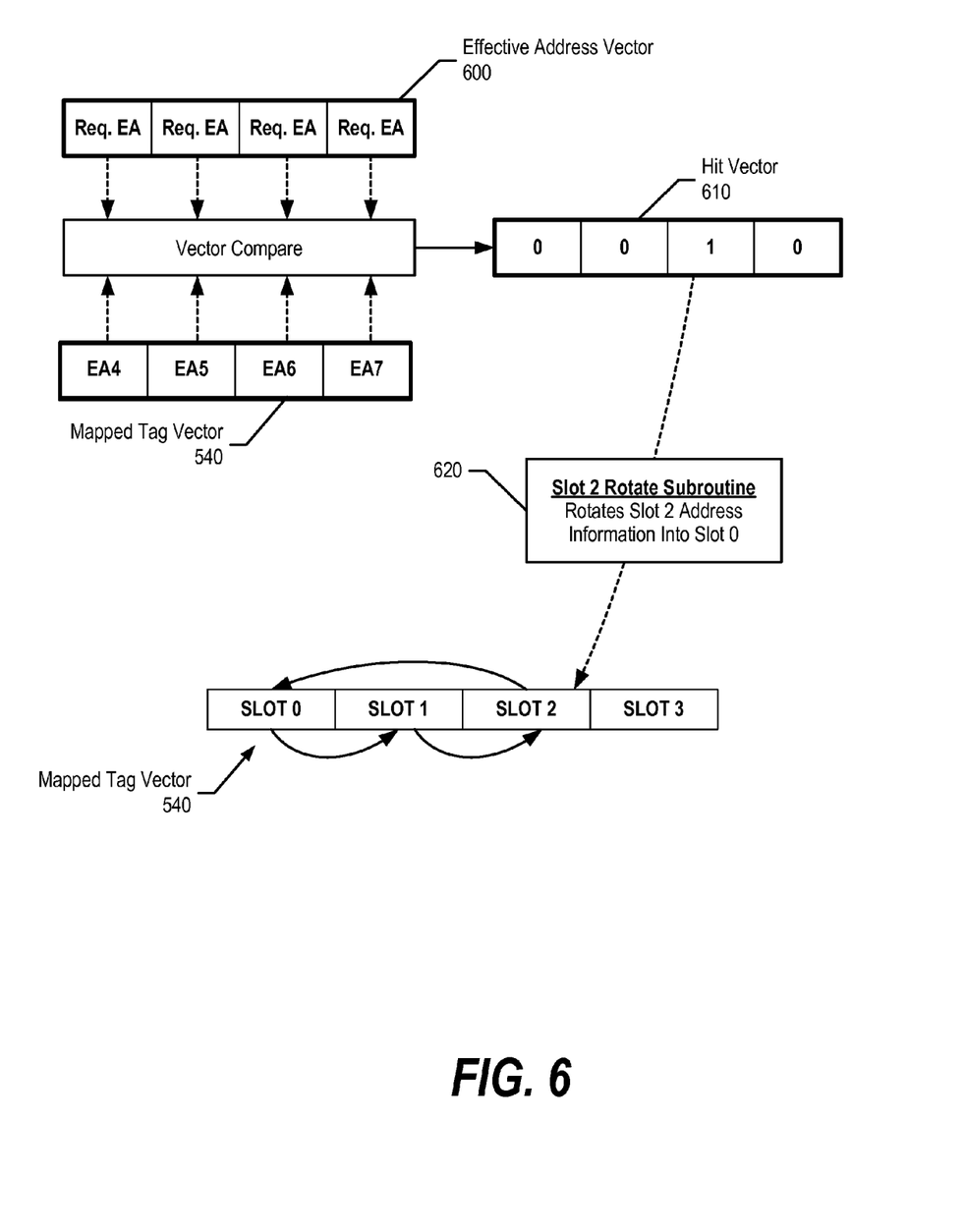
FIG. 6 is a diagram showing an embodiment for determining whether one of a tag vector's slot positions includes an effective address that matches a requested effective address.

FIG. 6 is a diagram showing an embodiment for determining whether one of a tag vector's slot positions includes an effective address that matches a requested effective address. Mapped tag vector 540 is the same as that shown in FIG. 5, which is the tag vector that the cache manager mapped to index value 520. In order to determine whether one of mapped tag vector 540's slot positions include an effective address that matches the requested effective address, the cache manager creates effective address vector 600 (includes the requested effective address in each slot) and compares effective address vector 600 with mapped tag vector 540. The result of the comparison is hit vector 610.

In the embodiment shown in FIG. 6, hit vector 610 includes a "1" in a slot position corresponding to the slot position of mapped tag vector 540 whose effective address matches the requested effective address. As those skilled in the art can appreciate, other mechanisms may be utilized to determine whether mapped tag vector 540 includes a matching effective address in one of its slot positions.

The example shown in FIG. 6 shows that mapped tag vector 540 slot position "2" includes a matched effective address. As such, the cache manager calls a rotate subroutine to rotate the matched effective address into mapped tag vector 540's most recently used slot position 0 (subroutine 620). In addition to rotating slot position 2's effective address into slot position 0, subroutine 620 also rotates (or shifts) slot position 0's effective address into slot position 1, and rotates slot position 1's effective address into slot position 2. As a result, the matched effective address, which is the newest effective address to be requested, is now stored in mapped tag vector 540's most recently used slot position 0.

FIGS. 7A-7D are diagrams showing various slot rotation subroutine executions that rotate effective addresses between slot positions based upon the slot position of a matched effective address (most recently used vector permute patterns).

Figure 7A:
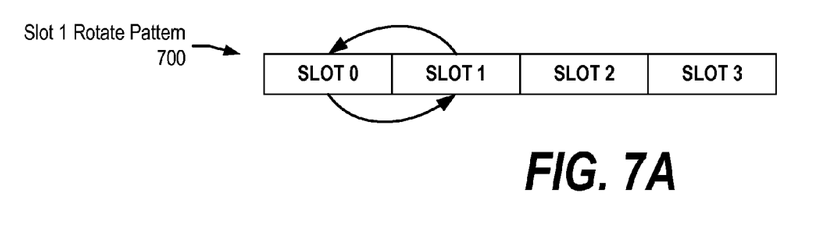
FIGS. 7A-7D are diagrams showing various slot rotation subroutine executions that rotate effective addresses between slot positions based upon the slot position of a matched effective address.

FIG. 7A is a diagram showing "slot 1" rotate pattern 700 rotating particular effective addresses between a mapped tag vector's slot positions. When the cache manager determines that a matched effective address resides in a mapped tag vector's slot position 1, the cache manager calls a "slot 1" subroutine. The slot 1 subroutine rotates the matched effective address located in slot position 1 into the most recently used slot position 0, and rotates the effective address located in the most recently used slot position 0 into slot position 1. In turn, the matched effective address becomes the most recently used effective address and is located in most recently used slot position 0.

Figure 7B:
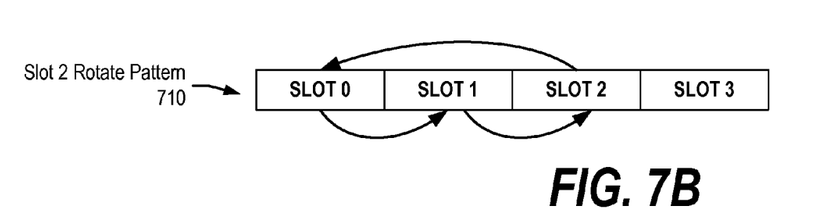

FIG. 7B is a diagram showing "slot 2" rotate pattern 710 rotating particular effective addresses between a mapped tag vector's slot positions. When the cache manager determines that a matched effective address resides in a mapped tag vector's slot position 2, the cache manager calls a "slot 2" subroutine. The slot 2 subroutine rotates the matched effective address located in slot position 2 into the most recently used slot position 0; rotates the effective address located in the most recently used slot position 0 into slot position 1; and rotates the effective address located in slot position 1 into slot position 2. As a result, the matched effective address becomes the most recently used effective address and is located in most recently used slot position 0.

Figure 7C:
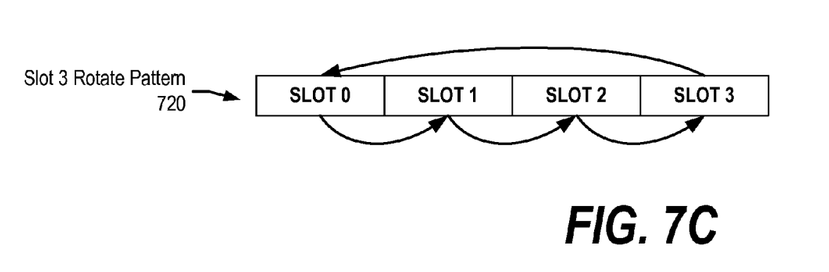

FIG. 7C is a diagram showing "slot 3" rotate pattern 720 rotating particular effective addresses between a mapped tag vector's slot positions. When the cache manager determines that a matched effective address resides in a mapped tag vector's slot position 3, the cache manager calls a "slot 3" subroutine. The slot 3 subroutine rotates the matched effective address located in slot position 3 into the most recently used slot position 0; rotates the effective address located in the most recently used slot position 0 into slot position 1; rotates the effective address located in slot position 1 into slot position 2; and rotates the effective address located in slot position 2 into slot position 3. Again, the matched effective address becomes the most recently used effective address and is located in most recently used slot position 0.

Figure 7D:
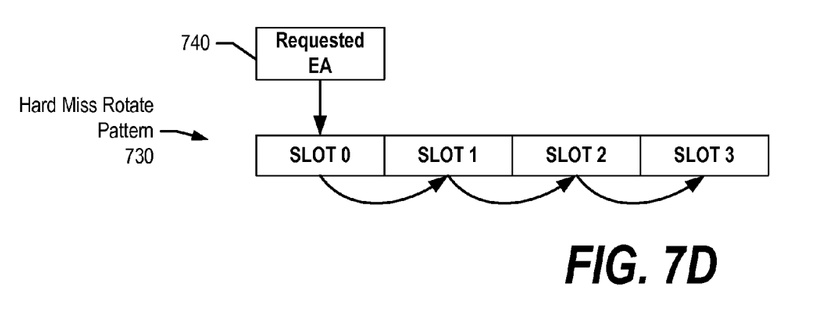

FIG. 7D is a diagram showing hard miss rotate pattern 720 rotating particular effective addresses between a mapped tag vector's slot positions. When the cache manager determines that none of the mapped tag vector's slot positions includes a matching effective address (hard miss), the cache manager loads the data from system memory into cache, and updates the mapped tag vector. As such, the cache manager stores requested effective address 740 (the data's corresponding effective address) into the most recently used slot position 0; rotates the effective address located in the most recently used slot position 0 into slot position 1; rotates the effective address located in slot position 1 into slot position 2; rotates the effective address located in slot position 2 into slot position 3; and casts out the effective address that was located in slot position 3. In turn, the requested effective address becomes the most recently used effective address and is located in most recently used slot position 0.

Figure 8:
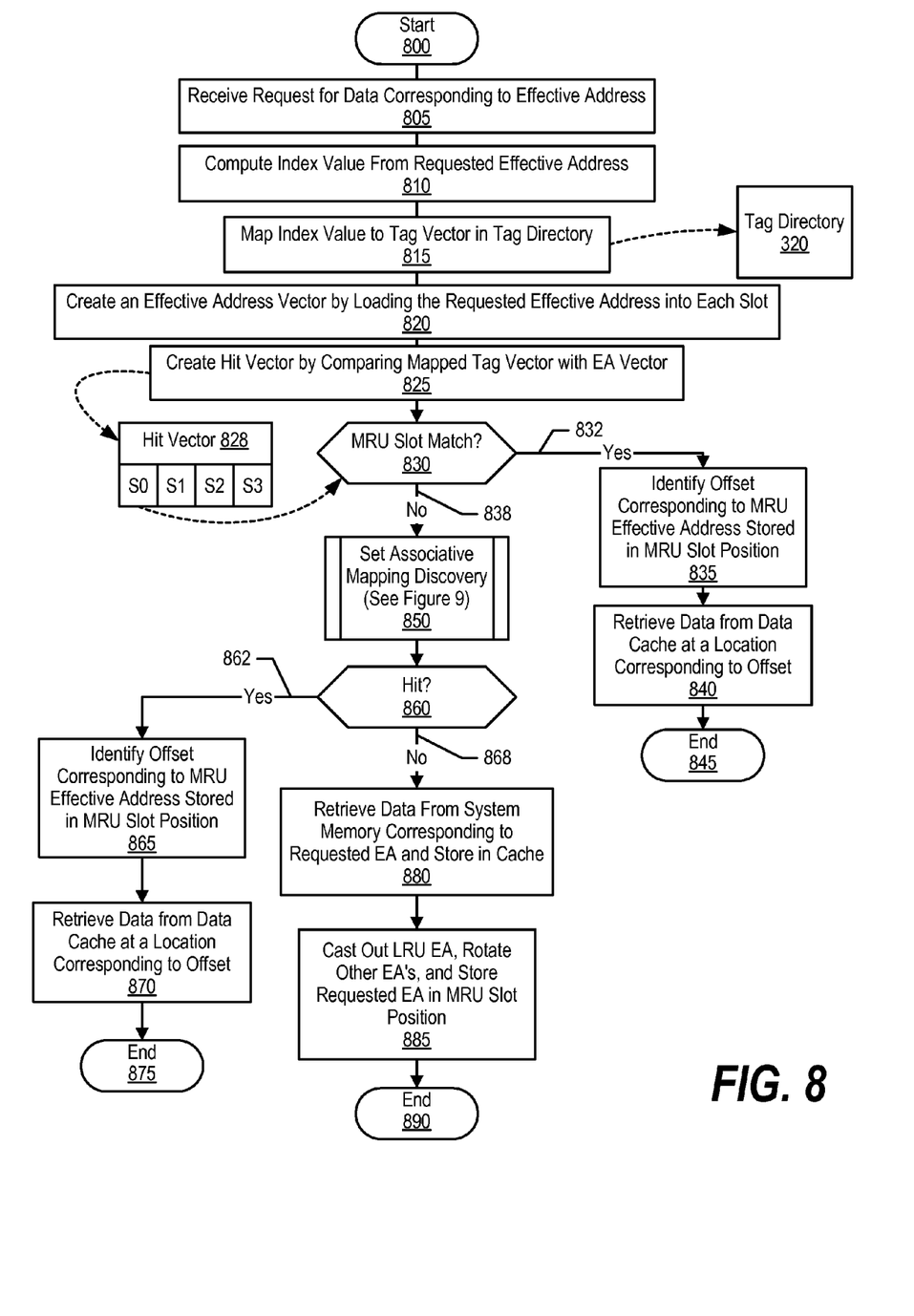
FIG. 8 is a flowchart showing steps taken in processing a data request using a multi-level mapping software cache.

FIG. 8 is a flowchart showing steps taken in processing a data request using a multi-level mapping software cache. Cache manager 315, shown in FIG. 3, performs a direct mapping discovery process to determine whether a requested effective address is located in a tag vector's most recently used slot position. When the requested effective address is not located in the tag vector's most recently used slot position, cache manager 315 performs a set-associative mapping discovery process to determine whether the requested effective address is located in one of the tag vector's subsequent slot positions. And, when the tag vector does not include the requested effective address in any of its slot positions, cache manager 315 loads data from system memory into the cache and updates the effective addresses stored in the tag vector's slot positions accordingly.

Processing commences at 800, whereupon processing (cache manager 315) receives a request for data corresponding to an effective address (requested effective address) (step 805). At step 810, processing computes an index value for the requested effective address using a hash algorithm. Processing maps (step 815) the index value to a particular tag directory line (tag vector) that is stored in tag directory 320. Tag directory 320 is the same as that shown FIG. 3.

At step 820, processing creates an effective address vector by loading the requested effective address in each slot of the effective address vector (effective address vector 600 shown in FIG. 6). As one skilled in the art can appreciate, this step may be performed at a time other than what is shown in FIG. 8, such as prior to computing the index value.

Processing, at step 825, compares the mapped tag vector with the effective address vector, which generates hit vector 828. Hit vector 828 includes a comparison result in each of its slot positions that correspond to the slot positions included in the effective address vector and the mapped tag vector. For example, if the tag vector's slot position 0 includes an effective address that matched the requested effective address, hit vector 828's slot position 0 will include a "1." As those skilled in the art can appreciate, other means of comparing vector slot positions may be utilized other than what is discussed herein.

A determination is made as to whether the tag vector's most recently used effective address stored in the tag vector's most recently used slot position matches the requested effective address by checking the value of hit vector 828's slot position 0 (decision 830) (direct mapping discovery). If the tag vector's most recently used effective address matches the requested effective address (direct map cache hit), decision 830 branches to "Yes" branch 832 whereupon processing identifies an offset corresponding to the most recently used effective address (step 835), and retrieves data from the data cache at a location corresponding to the offset (step 840). In one embodiment, the offset may be stored in the most recently used slot position alongside the most recently used effective address (see FIG. 4A and corresponding text for further details). In another embodiment, a corresponding offset vector may include the offset, such as that shown in FIG. 4B. Processing ends at 845.

Figure 9:
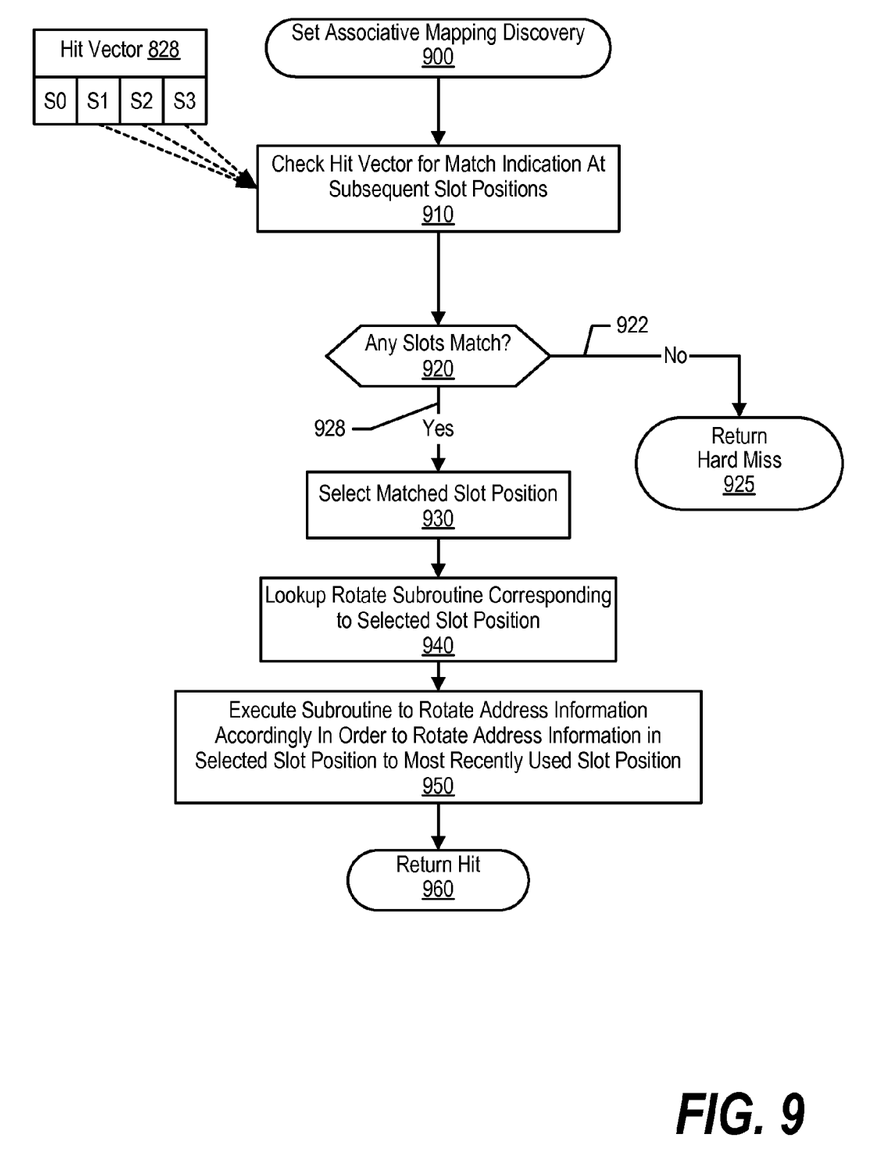
FIG. 9 is a flowchart showing steps taken in a cache manager performing a set-associative mapping discovery process using a mapped tag vector.

On the other hand, if the tag vector's most recently used effective address fails to match the requested effective address (direct map cache miss), decision 830 branches to "No" branch 838, whereupon processing performs a set-associative mapping discovery process by checking whether hit vector 828's subsequent slot positions indicate a match (predefined process block 850, see FIG. 9 and corresponding text for further details).

A determination is made as to whether the set-associative mapping discovery processes identified a set-associative cache hit (decision 860). When processing identifies a cache hit, processing rotates the matched effective address (and corresponding offset) to hit vector 828's most recently used slot position, and rotates the other effective addresses (and corresponding offsets) accordingly (see FIGS. 6, 7, 9, and corresponding text for further details).

If the set-associative mapping discovery processes resulted in a set-associative cache hit, decision 860 branches to "Yes" branch 862, whereupon processing identifies an offset corresponding to the effective address that was rotated into in the most recently used slot position (thus becoming the most recently used effective address) (step 865), and retrieves data from the data cache at a location corresponding to the offset (step 870). Processing ends at 875.

On the other hand, if the set-associative mapping discovery processes fails to result in a hit (set-associative cache miss (hard miss)), decision 860 branches to "No" branch 868, whereupon processing retrieves data from system memory at a location corresponding to the requested effective address and stores the data in cache (step 880). At step 885, processing casts out a least recently used effective address located in the mapped tag vector; rotates the effective addresses accordingly; and stores the requested effective address (and corresponding offset) in the mapped tag vector's most recently used slot position (see FIG. 7D and corresponding text for further details). Processing ends at 890.

FIG. 9 is a flowchart showing steps taken in a cache manager performing a set-associative mapping discovery process using a mapped tag vector. The cache manager, in FIG. 8, mapped a requested effective address to a particular tag vector included in a tag directory. The cache manager also performed a direct mapping discovery on the mapped tag vector's most recently used slot position, which resulted in a miss. The cache manager's next step is to perform a set-associative mapping discovery process on the matched tag vector's subsequent slot positions.

Processing commences at 900, whereupon processing checks hit vector 828's slot positions for a match indication, which indicates that one of the matched tag vector's subsequent slot positions includes a subsequent effective address that matches the requested effective address (step 910).

A determination is made as to whether any of hit vector 828's slot positions indicate a match (decision 920). If no slot positions indicate a match (set-associative cache miss (hard miss)), decision 920 branches to "No" branch 922 whereupon processing returns a hard miss at 925, therefore requiring the cache manager to retrieve data from system memory and load the data into cache (see FIG. 8 and corresponding text for further details).

On the other hand, if one of hit vector 828's slot positions indicates a set-associative cache hit, processing selects the matched slot position that includes the matched subsequent effective address (e.g., slot 2) at step 930 and, at step 940, processing looks up a corresponding rotate subroutine (e.g., selects a most recently used vector permute pattern) to rotate the mapped tag vector's effective addresses accordingly. The rotate subroutine rotates the matched subsequent effective address (and corresponding offset) to the tag vector's most recently used slot position, and rotates the other effective addresses (and corresponding offsets) accordingly (step 950, see FIGS. 7A-7C and corresponding text for further details). Processing returns a hit at 960. At this point the matched subsequent effective address is now located in the most recently used slot position, thus becoming the most recently used effective address.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving a request for data, the requested data corresponding to a requested effective address;
computing an index value from the requested effective address;
mapping the index value to a tag vector included in a plurality of tag vectors, wherein the tag vector includes a plurality of slot positions that each include one of a plurality of effective addresses, the plurality of effective addresses including a most recently used effective address and a plurality of subsequent effective addresses;
determining whether the requested effective address matches the most recently used effective address included in the tag vector;
in response to the requested effective address matching the most recently used effective address, identifying a cache location corresponding to the most recently used effective address and retrieving the data from the identified cache location;
in response to determining that the requested effective address fails to match the most recently used effective address in the tag vector, determining whether the requested effective address matches one of the plurality of subsequent effective addresses included in the tag vector; and
in response to determining that the requested effective address matched one of the plurality of subsequent effective addresses, identifying a different cache location corresponding to the subsequent effective address and retrieving the data from the different cache location.

2. The method of claim 1 wherein:
the most recently used effective address is stored in a most recently used slot position included in the plurality of slot positions and the plurality of subsequent effective addresses are each stored in one of a plurality of subsequent slot positions included in the plurality of slot position.

3. The method of claim 2 wherein the most recently used slot position includes an offset for computing the cache location.

4. The method of claim 2 wherein, in response to determining that the requested effective address matched one of the plurality of subsequent effective addresses, the method further comprises:
selecting one of the plurality of slot positions that includes the matched subsequent effective address; and
rotating one or more of the plurality of effective addresses to a different slot position included in the plurality of slot positions, wherein the rotating includes moving the matched subsequent effective address from the selected slot position to the most recently used slot position.

5. The method of claim 4 further comprising:
identifying an offset vector associated with the tag vector, wherein the offset vector includes an offset for computing the cache location; and
performing the rotation on the identified offset vector.

6. The method of claim 4 wherein the rotating is based upon a most recently used vector permute pattern.

7. The method of claim 2 wherein, in response to determining that the requested effective address failed to match one of the plurality of subsequent effective addresses, the method further comprises:
retrieving the data from system memory at a location corresponding to the requested effective address and storing the data in a new cache location; and
storing the requested effective address in the most recently used slot position, the storing including rotating the plurality of effective addresses to different slot positions included in the plurality of slot positions and casting out a least recently used effective address stored in a least recently used slot position included in the plurality of slot positions.

8. The method of claim 7 wherein the tag vector is a single instruction multiple data (SIMD) vector comprising four slot positions corresponding to a four-way associative cache mapping, the method further comprising:
wherein the most recently used slot position is located at slot 0; and
wherein the least recently used slot position is located at slot 3.

9. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
receiving a request for data, the requested data corresponding to a requested effective address;
computing an index value from the requested effective address;
mapping the index value to a tag vector included in a plurality of tag vectors, wherein the tag vector includes a plurality of slot positions that each include one of a plurality of effective addresses, the plurality of effective addresses including a most recently used effective address and a plurality of subsequent effective addresses;

determining whether the requested effective address matches the most recently used effective address included in the tag vector;

in response to the requested effective address matching the most recently used effective address, identifying a cache location corresponding to the most recently used effective address and retrieving the data from the identified cache location;

in response to determining that the requested effective address fails to match the most recently used effective address in the tag vector, determining whether the requested effective address matches one of the plurality of subsequent effective addresses included in the tag vector; and in response to determining that the requested effective address matched one of the plurality of subsequent effective addresses, identifying a different cache location corresponding to the subsequent effective address and retrieving the data from the different cache location.

10. The information handling system of claim 9 wherein: the most recently used effective address is stored in a most recently used slot position included in the plurality of slot positions and the plurality of subsequent effective addresses are each stored in one of a plurality of subsequent slot positions included in the plurality of slot position.

11. The information handling system of claim 10 wherein, in response to determining that the requested effective address failed to match one of the plurality of subsequent effective addresses, the information handling system further performs actions that include:

retrieving the data from system memory at a location corresponding to the requested effective address and storing the data in a new cache location; and storing the requested effective address in the most recently used slot position, the storing including rotating the plurality of effective addresses to different slot positions included in the plurality of slot positions and casting out a least recently used effective address stored in a least recently used slot position included in the plurality of slot positions.

12. The information handling system of claim 11 wherein the tag vector is a single instruction multiple data (SIMD) vector comprising four slot positions corresponding to a four-way associative cache mapping, the information handling system further performs actions that include:

wherein the most recently used slot position is located at slot 0; and wherein the least recently used slot position is located at slot 3.

13. The information handling system of claim 10 wherein the most recently used slot position includes an offset for computing the cache location.

14. The information handling system of claim 10 wherein, in response to determining that the requested effective address matched one of the plurality of subsequent effective addresses, the information handling system further performs actions that include:

selecting one of the plurality of slot positions that includes the matched subsequent effective address; and rotating one or more of the plurality of effective addresses to a different slot position included in the plurality of slot positions, wherein the rotating includes moving the matched subsequent effective address from the selected slot position to the most recently used slot position.

15. The information handling system of claim 14 wherein the information handling system further performs actions that include:

identifying an offset vector associated with the tag vector, wherein the offset vector includes an offset for computing the cache location; and performing the rotation on the identified offset vector.

16. The information handling system of claim 14 wherein the rotating is based upon a most recently used vector permute pattern.

17. A computer program product stored in a nonvolatile storage device, comprising functional descriptive material that, when executed by an information handling system, causes the information handling system to perform actions that include:

receiving a request for data, the requested data corresponding to a requested effective address;

computing an index value from the requested effective address;

mapping the index value to a tag vector included in a plurality of tag vectors, wherein the tag vector includes a plurality of slot positions that each include one of a plurality of effective addresses, the plurality of effective addresses including a most recently used effective address and a plurality of subsequent effective addresses;

determining whether the requested effective address matches the most recently used effective address included in the tag vector;

in response to the requested effective address matching the most recently used effective address, identifying a cache location corresponding to the most recently used effective address and retrieving the data from the identified cache location;

in response to determining that the requested effective address fails to match the most recently used effective address in the tag vector, determining whether the requested effective address matches one of the plurality of subsequent effective addresses included in the tag vector; and in response to determining that the requested effective address matched one of the plurality of subsequent effective addresses, identifying a different cache location corresponding to the subsequent effective address and retrieving the data from the different cache location.

18. The computer program product of claim 17 wherein: the most recently used effective address is stored in a most recently used slot position included in the plurality of slot positions and the plurality of subsequent effective addresses are each stored in one of a plurality of subsequent slot positions included in the plurality of slot position.

19. The computer program product of claim 18 wherein, in response to determining that the requested effective address matched one of the plurality of subsequent effective addresses, the information handling system further performs actions that include:

selecting one of the plurality of slot positions that includes the matched subsequent effective address; and rotating one or more of the plurality of effective addresses to a different slot position included in the plurality of slot positions, wherein the rotating includes moving the matched subsequent effective address from the selected slot position to the most recently used slot position.

20. The computer program product of claim 19 wherein the information handling system further performs actions that include:

identifying an offset vector associated with the tag vector, wherein the offset vector includes an offset for computing the cache location; and performing the rotation on the identified offset vector.

21. The computer program product of claim 19 wherein the rotating is based upon a most recently used vector permute pattern.

22. The computer program product of claim 18 wherein, in response to determining that the requested effective address failed to match one of the plurality of subsequent effective addresses, the information handling system further performs actions that include:

retrieving the data from system memory at a location corresponding to the requested effective address and storing the data in a new cache location; and storing the requested effective address in the most recently used slot position, the storing including rotating the plurality of effective addresses to different slot positions included in the plurality of slot positions and casting out a least recently used effective address stored in a least recently used slot position included in the plurality of slot positions.

23. The computer program product of claim 22 wherein the tag vector is a single instruction multiple data (SIMD) vector comprising four slot positions corresponding to a four-way associative cache mapping, the information handling system further performs actions that include:

wherein the most recently used slot position is located at slot 0; and wherein the least recently used slot position is located at slot 3.

24. The computer program product of claim 18 wherein the most recently used slot position includes an offset for computing the cache location.

25. A computer-implemented method comprising:

receiving a request for data, the requested data corresponding to a requested effective address;

directly mapping the requested effective address to a most recently used effective address included in a tag vector, wherein the tag vector includes a plurality of slot positions that each include one of a plurality of effective addresses, the plurality of effective addresses including the most recently used effective address and a plurality of subsequent effective addresses;

in response to the direct mapping resulting in a direct map cache hit, identifying a cache location in a cache corresponding to the most recently used effective address and retrieving the data from the identified cache location;

in response to the direct mapping resulting in a direct map cache miss, performing a set-associative mapping to the plurality of subsequent effective addresses included in the tag vector;

in response to set-associative mapping resulting in a set-associative cache hit, identifying a different cache location corresponding to the subsequent effective address and retrieving the data from the different cache location; and in response to the set-associative mapping resulting in a set-associative cache miss, retrieving the data from system memory and storing the data in the cache.

\* \* \* \* \*